UNITED STATES PATENT OFFICE.

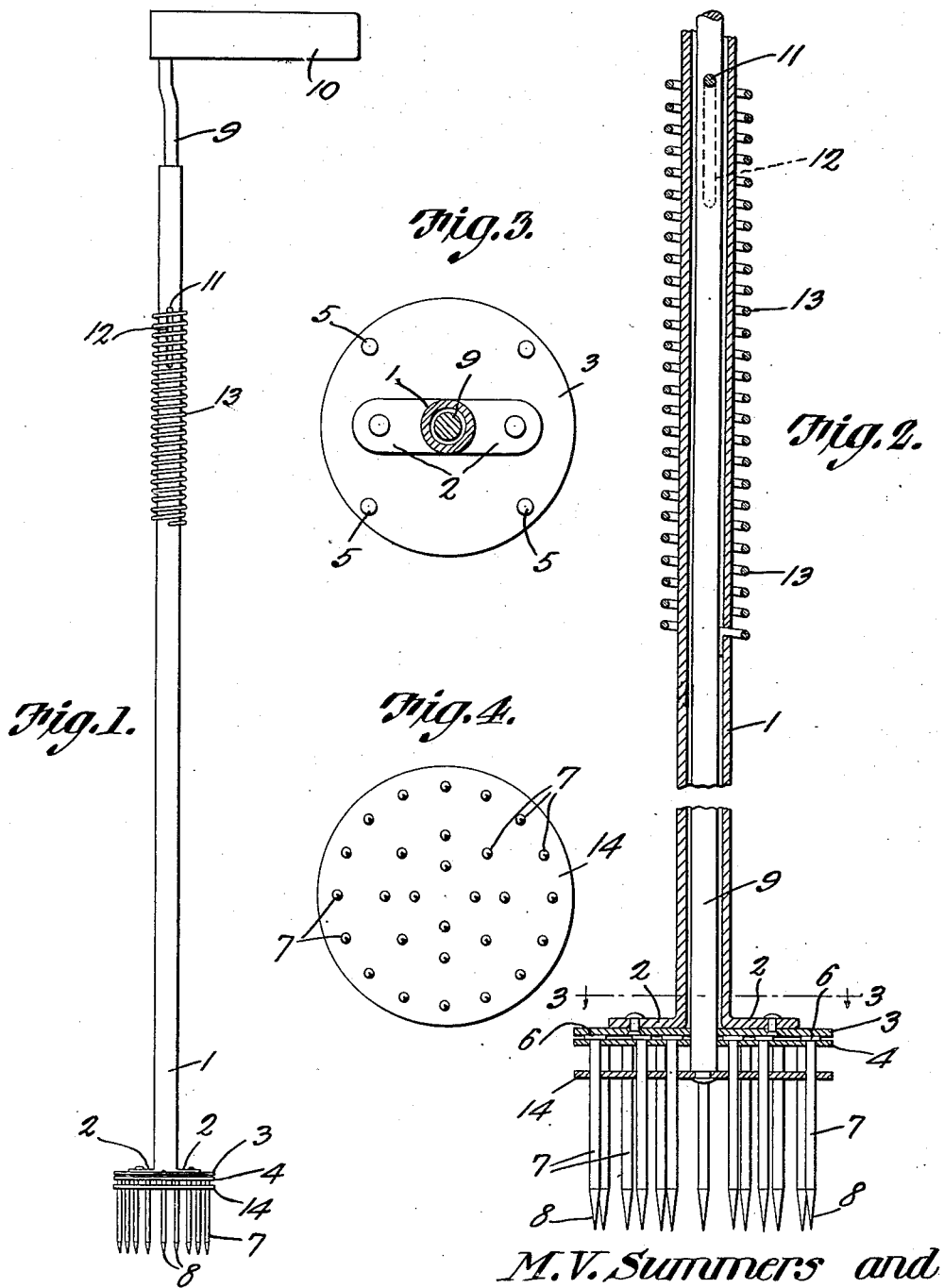

MARTIN VANDVER SUMMERS AND HENRY TRACY PASSMORE, OF KIRBYVILLE, TEXAS.

COTTON-SQUARE-GATHERING DEVICE.

1,246,487.     Specification of Letters Patent.     Patented Nov. 13, 1917.

Application filed January 2, 1917. Serial No. 140,204.

*To all whom it may concern:*

Be it known that we, MARTIN VANDVER SUMMERS and HENRY TRACY PASSMORE, citizens of the United States, residing at Kirbyville, in the county of Jasper, State of Texas, have invented a new and useful Cotton-Square-Gathering Device, of which the following is a specification.

This invention relates to a device for gathering punctured cotton squares.

It is well known to those skilled in the art that after a cotton square has become punctured by a boll weevil it will fall to the ground and the only way in which to keep in check the boll weevil pest is by carefully collecting these fallen squares and burning or otherwise destroying them. This operation under ordinary conditions is slow and tiresome.

One of the objects of the present invention is to provide a gatherer by means of which the punctured squares can be quickly collected off of the ground without compelling the user to bend, as ordinarily, with the result that a much smaller number of people can gather the punctured squares in a given area than has been possible heretofore in a given length of time.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—

Figure 1 is an elevation of a gatherer embodying the present improvements.

Fig. 2 is an enlarged central longitudinal section therethrough, a portion of the device being removed.

Fig. 3 is a section on line 3—3 Fig. 2.

Fig. 4 is a bottom plan view of the device.

Referring to the figures by characters of reference 1 designates an elongated tubular shank provided at one end with oppositely extending ears 2 riveted or otherwise secured to the backing disk 3 of the head of the device. A holding disk 4 is fastened to the backing disk 3 by rivets 5 or the like and interposed between these two disks 3 and 4 are the heads 6 of spikes 7 having sharpened points as indicated at 8.

Slidably mounted within the shank 1 is a stem 9 one end of which projects beyond the shank and has a handle 10 secured thereto. A pin 11 is extended radially from the stem and is adapted to slide within a longitudinal slot 12 formed within the shank, this pin bearing against one end of a coiled spring 13 which is mounted on the shank and is secured at its other end to said shank.

That end of the stem 9 which is remote from the handle 10 is secured to a stripping disk 14 which is slidably mounted on the spikes 7 and is normally held by spring 13 close to the disk 4 as shown in Fig. 2.

The device herein described is to be used in the same manner as a cane, the prongs or spikes 7 to be driven downwardly into the punctured squares lying on the ground. Each time the prongs or spikes are pressed downwardly the pin 11 will press against spring 13 so as thus to allow the handle 10 to yield to a slight extent and cushion the hand. After the prongs or spikes have become filled with the punctured squares, the tubular shank 1 is grasped near the disk 3 and is pulled longitudinally of the stem 9 until the disk 14 is pressed close to the points of the spikes or prongs 7, thus stripping the punctured squares from said spikes or prongs. The punctured squares can then be destroyed by burning or otherwise. As soon as the tubular shank 1 is released, the spring will return it to its normal position relative to the stem 9.

What is claimed is:—

A gathering device including spaced connected disks, parallel spikes extending from one of the disks, heads on the spikes interposed between the disks and constituting spacing means, a tubular shank fixedly mounted on the head and having a longitudinal slot, a stem slidably mounted in the shank, a stripping disk upon one end of the stem and slidably mounted on the spikes, a coil spring mounted on the shank and secured at one end thereto, means extending from the stem and slidably mounted within the slot for engaging one end of the spring to yieldingly hold the stripping disk supported close to the head, and a handle at one end of the stem.

In testimony that we claim the foregoing as our own, we have hereto affixed our signatures in the presence of two witnesses.

MARTIN VANDVER SUMMERS.
HENRY TRACY PASSMORE.

Witnesses:
  Lu Sunylecturn,
  J. B. McKeneon.